MASTER SOUND RECORD

Filed Jan. 12, 1949 2 Sheets-Sheet 1

INVENTOR.

Earle W. Jones

BY Victor J. Evans & Co.

ATTORNEYS

MASTER SOUND RECORD

Filed Jan. 12, 1949 2 Sheets-Sheet 2

INVENTOR.
Earle W. Jones
BY Victor J. Evans & Co.
ATTORNEYS

Patented Jan. 19, 1954 2,666,651

UNITED STATES PATENT OFFICE 2,666,651

MASTER SOUND RECORD

Earle W. Jones, Hastings-on-Hudson, N. Y.

Application January 12, 1949, Serial No. 70,445

2 Claims. (Cl. 274—42)

This invention relates to improvements in phonographic records, discs, tablets, tapes, cylinders, films, motion picture films, talking books and other sound devices in which sound tracks may be formed for use in recording and reproducing sound, and in particular the invention relates to the shape of and method of forming a sound track of the lateral undulatory type wherein the stylus forming the sound track is positioned perpendicular to the surface and remains perpendicular as it travels laterally in forming the track.

The invention also includes a method of reproducing wherein the reproducing stylus is positioned approximately perpendicular to the surface of the disc or record and also remains approximately perpendicular as it follows the tracks or oscillates.

The purpose of this invention is to provide an improved method of recording a sound or phonographic record or the like, wherein a transverse cross sectional area of the record groove remains constant at all times.

An object of this invention is to provide an improved phonographic record wherein the depth of the groove or sound track is uniform, the lower surface or root of the groove being parallel to the surface of the record.

In order that this invention may be properly understood, and its novel features correctly evaluated, it is desirable to have before us certain of the salient features appertaining to and inherent in lateral cut records.

By a careful study of the patent issued to J. W. Jones, No. 763,903, patented June 28, 1904, and the two patents issued to Eldridge R. Johnson, No. 778,975 and No. 896,059 a clear picture of the present day lateral-cut process will be understood.

Electrical recording and production of sound have supplanted the air-column method of recording and the mechanical means of reproduction, but otherwise the formula set up over forty years ago still is in use today.

There have been refinements in the technique used, both in the recording and the reproduction of records but in general it may be said that the method remains the same.

The present day cutting head, or recording instrument still uses the fulcrumed cutting stylus, and though the stylus angle has been enlarged to as much as 89° in some instances, the record groove retains all of its major faults, i. e.—variable depth, variable side-wall angle and variable width of cut.

It is important to understand the general construction of, as well as the function of, the cutting head to properly evaluate my new method of recording and/or reproduction of phonographic records.

In the usual method of making a sound track the electrical impulses, from the output of the recording amplifier, are fed into a recording instrument known as the "Cutting head."

These electrical impulses, in their passage from the microphone or other source, have been so treated that they cause the stylus arm or armature of the said cutting head to vibrate laterally in synchronism with the said impulses.

The stylus arm is fulcrumed at approximately its central point.

On one end of the arm is mounted the cutting stylus, usually a sapphire having a sharp V cutting point. The opposite end of the stylus arm, or armature moves about the fulcrum and is centered between the pole pieces of the coils of the cutting head with the aid of certain damping means.

The normal response of any good cutting head extends from 30 to 10,000 cycles per second.

The modulated audio electrical impulses, arriving from the recording amplifier, pass through the cutting-head coils varying the magnetic field therein, and in turn causing the armature to oscillate in synchronism with the said electrical impulses.

With the cutting head in position to make a cut the stylus will be perpendicular to the surface of the material to be cut, that is where no modulated current is passing through the coils. Note: In practice the cutting head may be slightly off the perpendicular for better cutting results as heads and/or styli vary slightly.

Recording styli usually found in use today are of either the 87 or 70 degree angle type and have a circularly arcuate nose, or tip, which measures from 0.002'' to .0025 of an inch in radius. The side walls are flat and extend at a tangent upward from the arc of the tip.

Johnson first used this type of cutting stylus, claiming that the groove made by such a stylus lent itself most readily to the greater freedom of oscillation for the reproducing stylus.

Having a stylus of 87 degree angle, and in an unmodulated position, i. e.—perpendicular, the wall angle formed by the stylus, with the surface of the material to be recorded is 133½ degrees.

As soon as the stylus moves from its perpendicular position, due to being modulated, it traces an arc about its pivot or fulcrum depending upon which direction the stylus is at the moment moving. When moving to the right the right hand angle decreases and the left hand angle increases by a like amount, and, the reverse takes place as the stylus swings back to the left.

It will thus be noted that the angle of the side walls of the record groove are constantly varying relative to the plane of the material being cut and in direct ratio with the swing of the stylus At the same time it will be noted that as the stylus swings in its arc, in response to the modulated impulses, the actual bottom of the cut or that portion located at the very tip of the stylus shifts from its central position, relative to the side walls, and at the same time causes the depth of the cut to vary, as it follows the arc, in direct proportion with the amount of swing of stylus.

It therefore becomes apparent why a lateral cut record must have a certain depth to keep the reproducing point or needle from leaving the groove on the wider swings of the stylus, and second with the changes of angle of the side walls, and with the change in the position and/or depth of cut it is apparent that no one reproducing point could be designed to fit all of these variable conditions.

It is general practice today to record lateral cut records with a frequency response range from 30 to 10,000 cycles per second, with groove pitches ranging up to 225 lines per inch, and at speeds of 78 and 33⅓ revolutions per minute.

In recording, as well as in reproducing, any record where as many as 225 lines per inch are involved several factors calling for special consideration arise. (*a*) It is desirable that the stylus should have a much smaller tip radius, than the standard 0.0025″, (*b*) It is most desirable to reduce the stylus angle from the 87° to as small an angle as may be commercially possible, (*c*) The depth of cut must be reduced as much as may be practical and still cause the reproducing stylus to track properly.

It may be pointed out that at 33⅓ R. P. M. using a .0025″ radius spherical type for the playback stylus, the 7-inch diameter groove will be down about 20 decibels in response at 10,000 cycles per second. The smaller the groove diameter (the lower the relative velocity of the groove with respect to the stylus), the shorter is the wavelength at a given frequency and the more abrupt are the corners the stylus is required to track. When a half wavelength is comparable to the dimensions of the stylus, it can only bounce slightly in greatly distorted saw-tooth waveforms. If the stylus radius is reduced, it should be able to track a shorter wavelength successfully. This holds true only if proper coupling to the groove is obtained which requires proportional scaling down of groove dimensions. This leaves an excessive amount of land between the grooves and makes it possible to close up the pitch. (Loading effects on the cutter are neglected here since they may be properly compensated for with little difficulty.) The amplitude of the cutter drive must also be lower in proportion. Note, too, that the diameter at which the 20 decibel loss appears at 10,000 cycles per second becomes proportionally smaller.

In all lateral disc recordings the excursion amplitude of the stylus is limited by the groove spacing at low frequencies, which is the principal reason for constant amplitude recording below a turnover frequency around 300 to 500 cycles per second. This limitation does not appear at high frequencies recorded at constant velocity because the excursion amplitude at constant velocity is inversely proportional to frequency. In recordings made at the pitch of 225 lines per inch, or greater, the maximum permissible amplitude of low frequencies is about half the amplitude possible with standard grooves.

In making a fine grooved record, of 225 lines per inch or better, we are reducing the land area between grooves, as well as the width of groove and so must reduce the spherical nose radius of both our cutting and playback styli to retain the accepted balance of groove to land area, of 50/50, which is considered ideal.

To reduce the nose area of the cutting stylus offers no hardship, but to reduce the nose radius of the reproducing stylus, as becomes necessary, from the 0.0025″ to one of 0.001″ sets up relationships which are difficult to overcome.

In the reduction of the surface area beneath the reproducing stylus tip when its spherical radius is reduced from 0.0025″ to 0.001″ the factor is squared. To reduce the tracking pressure from the accepted standard of 25 grams for the 0.0025″ stylus, to one of 5 grams for the 0.001″ stylus, is not good mechanics, inasmuch as when we reduce the weight of our reproducer head we reduce the stability factor supporting the fulcrum or pivot point of the reproducing armature.

Again, unless we are able to reduce this tracking pressure on our 0.001″ reproducing stylus so that it will be comparable with that on the standard 0.0025″ stylus, i. e.—25 grams, our stylus will cut into the walls of the groove.

With the above facts and other objects and advantages in view my invention consists of the new, novel, and useful combination, construction, and arrangement of parts as hereinafter more fully described, and set forth in the claims appended hereto, and disclosed in the accompanying drawings which form a part hereof, wherein:

Figure 1:
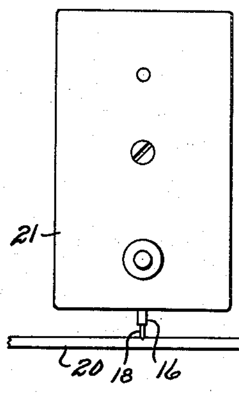
Figure 1 is a view illustrating a stylus mounting of the vertical type as is commonly used.

Referring now to the drawings in detail wherein like reference characters denote corresponding parts, the improved method of forming sound tracks on a phonograph record of this invention includes a stylus 10 attached to a fulcrumed arm of the recording-head 11 and the stylus is actuated so that the nose 12 thereof oscillates laterally to form a record groove or sound track 13 having a bottom surface 14 of constant depth and in a plane which is parallel to the surface of the record 15.

Figure 4:
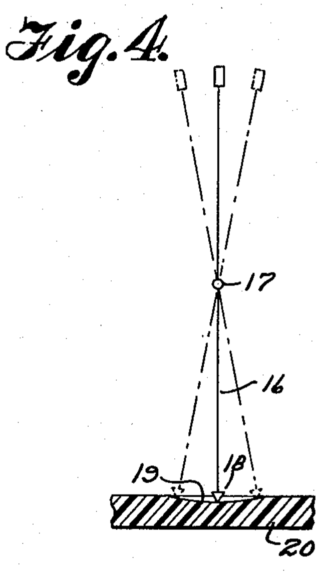
Figure 4 is a diagrammatic view illustrating the movement of the point of a stylus of the usual type wherein the point is rotated about its center in which the point forms a groove or sound track with an arcuate bottom.
Figure 5:
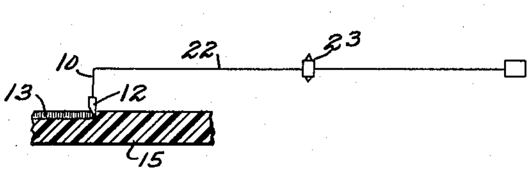
Figure 5 is a diagrammatic view illustrating the improved method of mounting the stylus wherein the point oscillates laterally with the tip of the point traveling in a plane parallel to the face of the record.
Figure 6:
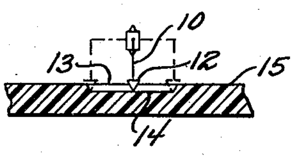
Figure 6 is also a diagrammatic view showing a section through a sound track of a record and illustrating the lateral travel of the point of the stylus.
Figure 7:
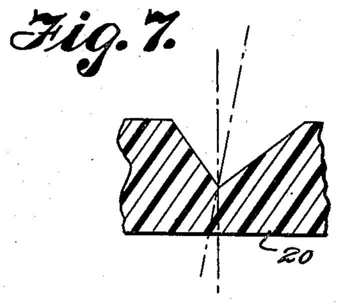
Figure 7 is a detail showing a section on an enlarged scale through a groove or sound track of a phonograph record illustrating the usual method of forming the grooves.

In the usual method of mounting a stylus arm as illustrated in Figures 1 and 4, the stylus 16 is pivotally mounted at a point 17, and as it is caused to oscillate by the modulated signals passing through the cutting-head coils the point 18 thereof travels on a radius about the center 17 thereby to form a sound groove having an arcuate bottom or lower surface 19 in a record as indicated by the numeral 20. In this type of mounting the cutting-head 21 together with its stylus and its fulcrumed armature are vertically positioned as shown in Figure 1.

In the design illustrated in Figures 2, 3, 5 and 6, a stylus 10 is positioned perpendicular to the face of the record 15, these views showing the stylus mounted on the outer end of a fulcrumed arm 22 which arm is positioned parallel to the face of the record and pivotally mounted by a vertically positioned pin 23 whereby as the rod 22 is oscillated, a point 12 of the stylus will travel laterally in a plane parallel to the face of the record.

To compensate for unevenness in the surface of material in which a groove is being cut the cutting or recording head is supported by an advance ball 24 carried by an arm 25 attached to the under surface of the head 11 by a screw 26 through a spring section 27. The arm 25 is provided with a leg 28 on the lower end of which the ball 24 is carried and the position of the ball is controlled by an adjusting screw 29 which is threaded in a bracket 30 secured to the face of the head by screws 31. The lower end of the screw 29 is arcuate and this is positioned in an arcuate recess in the upper surface of the arm 25.

Figure 8:
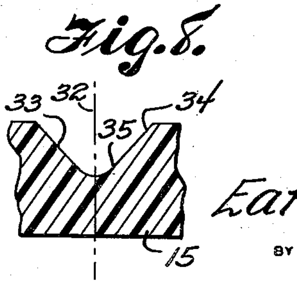
Figure 8 is a similar detail illustrating the method of forming the improved groove wherein the base of the groove is parallel to the surface of the record and the angles of the side walls remain constant.
Figures 9, 10, 11, 12:
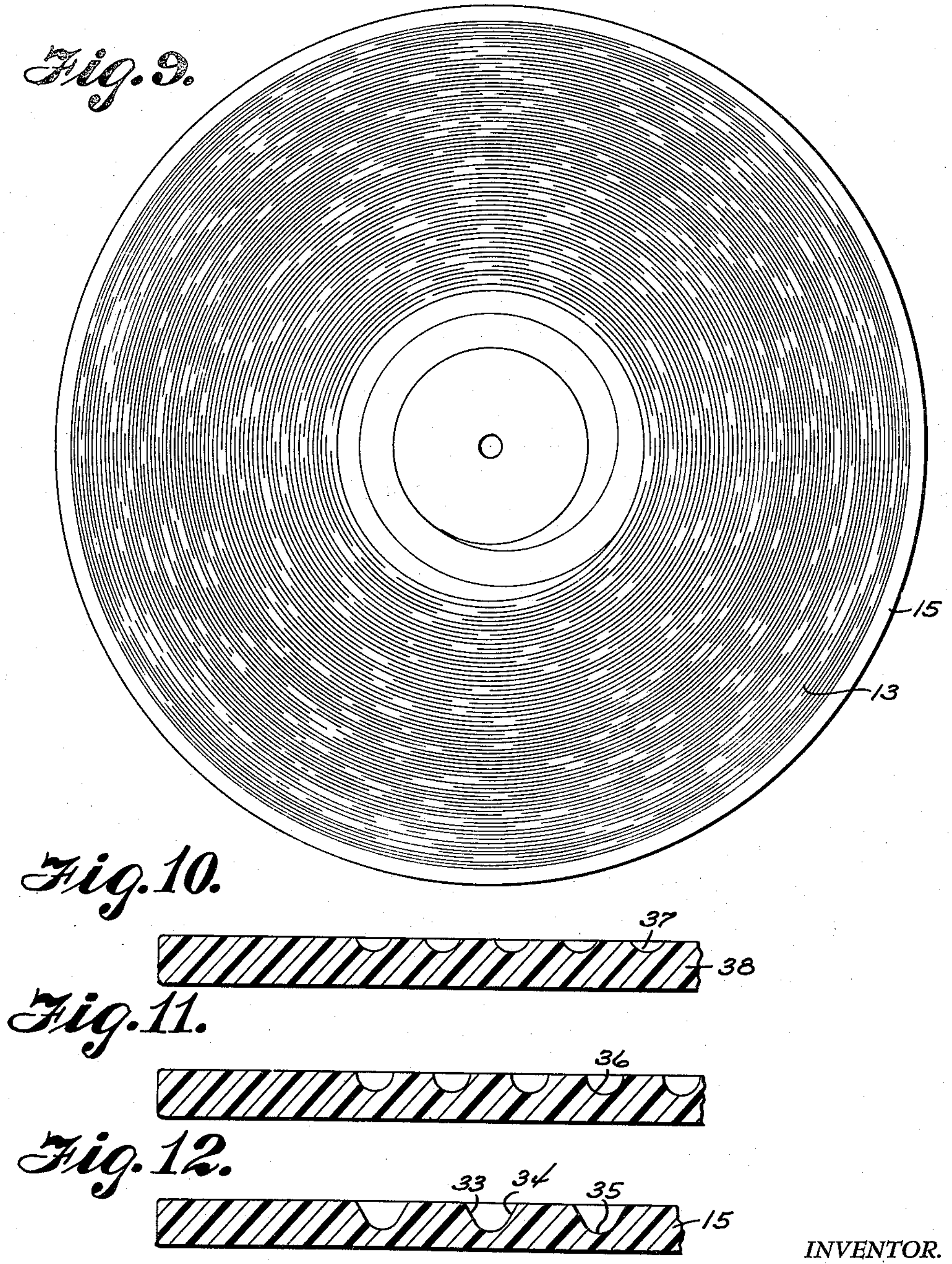
Figure 9 is a plan view of a phonograph record.
Figure 10 is a detail showing a section through one side of a phonograph record on an enlarged scale and illustrating an arcuate groove described from a center above the face of the record.
Figure 11 is a similar detail showing a groove semi-circular in cross section with the center of the circle in a plane corresponding to the face of the record.
Figure 12 is a similar detail showing a groove having a cylindrical root with divergent side walls tangent to the radius of the cylinder.

With the groove or sound-track formed as illustrated in the drawings and particularly in Figure 8, the center line 32 of the groove is perpendicular to the face of the record and bisects the angle of the groove with the angles on each side and with the angles at the upper corners of the groove, where the sides 33 and 34 then meet the surface of the record, remaining constant. The vortex 35 of the groove may be formed with a point or this tip may be spherical with the sides of the groove tangent to the radius of the point as shown in Figures 8 and 12 or the groove 36 may be substantially semi-circular as shown in Figure 11 with the radius corresponding to the radius of the tip of the reproducing stylus and positioned in a plane corresponding to the surface of the record. With the recording stylus remaining perpendicular as it oscillates a continuous even depth, constant cross-sectional groove is formed. Where the recording stylus and the reproducing stylus have the same semi-circular tips, having corresponding radii, a continuous bearing surface is obtained with the tip surface of the reproducing stylus always in constant and continuous contact with the corresponding areas or surfaces of the groove.

Instead of swinging upwardly as the tip of the stylus oscillates from the center toward either side, the tip of the stylus, therefore, remains in a plane parallel to the surface of the material being cut, whereby the root or base of the groove is parallel to the face of the record material.

The groove may also be made as shown in Figure 10 wherein a groove 37 is formed with the chord of the arc intersecting the surface of the record 38 and with the center of the circle of which the arc forms a part positioned above the surface of the record.

This continuous contact throughout the circumference of the reproducing point reduces wear on both the reproducing point and the record as well which in turn extends the life of both. The continuous area contact also provides additional supporting means whereby it is not essential to reduce the weight of the pickup, thereby increasing the inertia factor of the pivot or fulcrum point, which in turn makes it possible to reproduce a much extended band of frequencies.

I have found in practice that with a recording and reproducing stylus, each having a spherical tip of 0.0015" diameter (using my process of recording), that it is possible to record and reproduce commercially 400 or more lines per inch.

Figure 2:
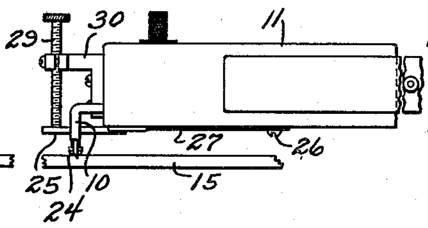
Figure 2 is a side elevational view of a stylus mounting as used in this invention, wherein the stylus is set at an angle of 90° and the point is actuated to travel laterally in a plane parallel to the face of a record in the oscillation thereof, and showing an advance ball for supporting the cutting head and controlling the depth of the cut.
Figure 3:
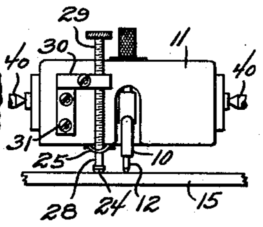
Figure 3 is a front elevational view of the stylus mounting shown in Figure 2.

In the cutting of fine grooved records, i. e.—200 or more lines to the inch, the customary method of damping the cutting-head against the undulatory motions caused by the uneven surface being cut, is found to be inadequate inasmuch as the finer pitched grooves demand a constant even depth of cut to maintain the most exacting tolerance which must be held. To clarify the point further the diameter of the outside or first groove, in a 12 inch record, usually measures 11½ inches, whereas the inner or last record groove usually measures approximately 4½ inches. This gives a differential of 2½–1 in the lineal surface speed. The groove being a volute spiral, the change in surface speed is uniform, i. e.—a 12 inch disc running at 78 R. P. M. has an outer speed of 2818-inches per minute (78×36.1284"), and the inner 4½ inch groove has but 1102.7 lineal inches (78×14.1372"). The normal damping means, as referred to above, is not capable of automatically compensating for this change in the surface speeds with the result that the groove widens and deepens in direct ratio to the retardation of the lineal surface speed. Such a condition becomes prohibitive when fine pitch grooves are being cut due to the fact that, with the fine pitch grooves, the balance between groove-width and land area is critical, particularly with the wider swings of the stylus. In all lateral cut recordings the excursion amplitude, of the cutting stylus, is limited, by the land area at low frequencies, hence it becomes apparent that if it is desired to record the same low frequencies in the inner grooves as in the outer the groove-to-land areas must be maintained constant. To meet this condition I employ the advance-ball 24. The said advance-ball is preferably a sapphire having its polished contact surface domed. The curvature is not critical, however I have found that an advance ball having a curvature of a segment of the arc of a circle of 9 feet in diameter will safely carry a weight of several ounces without marring the polish of the surface being recorded. I mount the advance-ball alongside and in advance of the cutting stylus as shown in Figures 2 and 3, but in the same plane relative to the trunnion pivot-point 43 which controls the perpendicular action of the cutting head and/or its stylus. The said advance-ball has a micrometer adjustment through the screw 29, which makes it possible to adjust the depth of the stylus cut to well within 0.0001 inch, and maintain this depth of cut irrespective of changes in the lineal surface speeds and/or any perpendicular undulations of the cutting-head due to surface variations in the record material itself.

While I have chosen to use a popular design of cutting head to illustrate some of the more outstanding and distinctive differences between the well known lateral cut process and my new horizontal cut process I wish it understood that I have taken this means not only to point out the above mentioned differences but to illustrate how my horizontal cut groove could be made by this type of cutting head which groove when so made is perfectly adapted for use with the standard makes of reproducing pick-ups of which there are several millions in daily use. These pick-ups without exception use the fulcrumed needle arm, which means that the play-back needle tip swings arcuately, and as my horizontal cut groove when made using the present day fulcrumed cutting-heads still retains all of its new characteristics as described above it does use the fulcrumed arm and therefore the cut or groove still remains arcuate, however its arcuate character does not, as in the lateral cut, cause an undulating depth of cut, but translates the arcuate movement of the cutting arm into a turning movement of the face of the cutting stylus or cross section of the groove which causes it to remain at right angles to the center line of the pick-up point versus its fulcrum, a most desirable feature.

I have developed a new type of cutting-head and/or reproducing pick-up as disclosed in my co-pending application for Sound Record and a Cutting and/or Reproducing Device Therefor filed herewith, which will record and/or reproduce my horizontal cut groove with even greater fidelity than with the fulcrumed cutting-heads. A separate application is being filed covering these instruments, and the cut made therewith.

It is thought advisable to briefly outline their action in this application as they bear directly upon it.

My new type of cutting-head makes use of two open-cored solenoids, mounted end-to-end with their bores in a straight line so as to accommodate a common movable core. This movable-core is positioned in the bore of the solenoids and a stylus arm is affixed thereto at its center, the said stylus arm being at right angles to the moving-core, and in its perpendicular position while under the influence of the electrical impulses and the oscillations of the moving-core in response thereto. This gives a cross-section to the groove which will at all times be at right angles to the said groove and at the same time will have all of the other characteristics of my horizontal cut.

I wish to draw attention to the fact that in all lateral cut recordings, with their arcuate undulating groove, the greater amplitudes are at the bottom of the cut, due to the fact that the stylus arm is fulcrumed, and that the said amplitude becomes smaller as you approach the surface, whereas in my horizontal cut the amplitude is constant throughout the entire cross-section of the said groove. It should be further noted that in the lateral cut the stylus tip usually has a tip-radius of .002 inch, and where an 87 degree angled stylus is used a mean surface width of groove of .005 inch is obtained, therefore the said reproducing stylus never makes contact with that section of greatest amplitude, in the groove, but rides upon one or both of the tangent-planes of the groove with the spherical tip never being in direct contact with the bottom of the groove. In my horizontal cut the groove is so formed that the spherical tip of the reproducing stylus fits throughout its entire tip-surface into the groove, acting as the ball of a ball-and-socket joint, and thereby gives a correct reproduction of the said undulations. The result High Fidelity reproduction.

In the making of sound records it is necessary to keep in mind, at the time of recording, the purpose for which the recording is being made so that the cut may be adjusted as to amplitude of swing, depth of cut and width of groove. The reason for this is due to the fact that if the said recordings are to be used with the usual composition-stock, i. e.—shellac, rosin, whiting, slate, etc., a much stronger wall and less amplitude is necessary than where such materials as Vinylite or other break-resisting materials are used in the forming of the record. With the standard shellac record compositions the play-back life is short due to the fact that the sound track distintegrates, due to the impact of the reproducing stylus, particularly at the points of greater and/or sharper swings, whereas with the Vinylite and other break resisting materials this does not so readily happen, and a much thinner wall or land area becomes possible which means that a finer pitch may be recorded.

The finest lateral cut pitch yet to appear on the open market is one of 225 lines or grooves per inch. To effect this fine grooved recording it was necessary to reduce the tip of the recording and reproducing styli to .001 inch. It is not difficult to reduce the recording stylus to the .001 inch radius, but the reproducing stylus offers other serious obstacles such as weight of reproducing pickup. To reproduce this fine grooved record of 225 lines to the inch, using the .001 inch diameter reproducing stylus requires the lightening of the pick-up from the customary 25 gram weight to one of approximately 5 grams, otherwise the fine .001 inch reproducing point will score and cut the record groove at the first playing. In lightening the pick-up weight to the 5 grams you automatically remove the stability factor (weight or inertia) of the pivot point of the fulcrumed stylus (reproducer) arm or armature. Naturally if you allow the inertia factor of the pick-up head to be removed the pivot point becomes non-operative and the whole head oscillates with the groove instead of the stylus arm. Under such conditions only very poor reproduction could be expected. With my horizontal cut record due to the fact that I rest the entire surface of the spherical tip of the reproducing stylus in the groove, i. e.—ball-and-socket joint, I am able to use very fine reproducing points and still retain the full standard weight of reproducer-head without scoring the groove even after a great many playings. I have found it practical to reduce the angle of the cutting stylus from the customary angle of 87 degrees to one of 45 degrees without marring the reproducing quality of the groove. I retain my standard spherical tip as used with the 87 degree stylus, and reduce the angle and due to the even depth of the horizontal cut and its spherical bottom am able to increase the pitch of the grooves materially.

In the following claims I wish it understood that where I speak of the groove I mean any cut, track or trace made by an engraving or cutting tool or stylus, and where I speak of a reproducing stylus I have in mind any type of pick-up means. Where I refer to the record it is to be understood that I mean any material which may receive or register a sound track record groove, i. e.—tape, film, tablet, cylinder or the like.

Having described the invention, what is claimed is:

1. A master record comprising a record disc having a wholly sound recorded laterally undulatory spiral sound groove of constant width, constant depth and constant transverse cross section at right angles to the axis of the groove, the side walls of the groove being symmetrical in respect to the axis and carrying the undulations impressed by the sound impulses of the original recording, said undulations being parallel to the surface of the record and free from any vertical components whereby the extent of lateral undulations are the same from the surface of the record to the bottom of the groove and the cross section of the groove at right angles to the axis being the same in both sound modulated and unmodulated portions of the groove.

2. A master record comprising a record member having a wholly sound recorded laterally undulatory sound groove of constant width, constant depth and constant transverse cross section at right angles to the axis of the groove, the side walls of the groove being symmetrical in respect to the axis and carrying the undulations inscribed by the sound impulses of the original recording, said undulations being parallel to the surface of the record and free from any vertical components whereby the extent of lateral undulations are the same from the surface of the record to the bottom of the groove and the cross section of the groove at right angles to the axis being the same in both sound modulated and unmodulated portions of the groove.

EARLE W. JONES.

References Cited in the file of this patent

UNITED STATES PATENTS

| Number | Name | Date |
|---|---|---|
| 372,786 | Berliner | Nov. 8, 1887 |
| 964,221 | Edison | July 12, 1910 |
| 1,084,415 | Emerson | Jan. 13, 1914 |
| 1,145,360 | Emerson | July 6, 1915 |
| 1,368,745 | Owen et al. | Feb. 15, 1921 |
| 1,461,849 | Jones et al. | July 17, 1923 |
| 1,776,097 | Baird | Sept. 16, 1940 |